US012729266B2

(12) United States Patent
Janssen

(10) Patent No.: US 12,729,266 B2
(45) Date of Patent: Sep. 8, 2026

(54) DISPERSIONS THAT ARE SUBSTANTIALLY FREE OF VOLATILE ORGANIC COMPOUNDS AND THAT HAVE A HIGH SOLIDS CONTENT

(71) Applicant: Stahl International B.V., Waalwijk (NL)

(72) Inventor: Rick Andreas Louis Janssen, Kaatsheuvel (NL)

(73) Assignee: Stahl International B.V., Waalwijk (NL)

( * ) Notice: Subject to any disclaimer, the term of this patent is extended or adjusted under 35 U.S.C. 154(b) by 700 days.

(21) Appl. No.: 17/318,602

(22) Filed: May 12, 2021

(65) Prior Publication Data

US 2021/0261717 A1 Aug. 26, 2021

Related U.S. Application Data

(63) Continuation-in-part of application No. PCT/NL2019/050792, filed on Nov. 29, 2019.

(30) Foreign Application Priority Data

Nov. 30, 2018 (NL) ..................................... 2022104

(51) Int. Cl.

| | |
|---|---|
| ***C08G 18/44*** | (2006.01) |
| ***C08G 18/08*** | (2006.01) |
| ***C08G 18/12*** | (2006.01) |
| ***C08G 18/34*** | (2006.01) |
| ***C08G 18/40*** | (2006.01) |
| ***C08G 18/42*** | (2006.01) |
| ***C08G 18/48*** | (2006.01) |
| ***C08G 18/66*** | (2006.01) |
| ***C08G 18/72*** | (2006.01) |
| ***C08G 18/73*** | (2006.01) |
| ***C08G 18/75*** | (2006.01) |
| ***C08J 5/18*** | (2006.01) |
| ***C09D 175/04*** | (2006.01) |

(52) U.S. Cl.
CPC ......... *C08G 18/44* (2013.01); *C08G 18/0828* (2013.01); *C08G 18/12* (2013.01); *C08G 18/348* (2013.01); *C08G 18/4018* (2013.01); *C08G 18/4202* (2013.01); *C08G 18/4833* (2013.01); *C08G 18/4854* (2013.01); *C08G 18/6625* (2013.01); *C08G 18/6692* (2013.01); *C08G 18/722* (2013.01); *C08G 18/73* (2013.01); *C08G 18/755* (2013.01); *C08J 5/18* (2013.01); *C09D 175/04* (2013.01)

(58) Field of Classification Search
CPC .... C08G 18/44; C08G 18/73; C08G 18/4854; C08G 18/0828; C08G 18/348; C08G 18/6625; C08G 18/722; C08G 18/6692; C08G 18/755; C08G 18/4018; C08G 18/4202; C08G 18/4833; C08G 18/12; C08J 5/18; C09D 175/04
See application file for complete search history.

(56) References Cited

U.S. PATENT DOCUMENTS

| | | | |
|---|---|---|---|
| 3,989,869 A | 11/1976 | Neumaier et al. | |
| 4,046,729 A | 9/1977 | Scriven et al. | |
| 4,066,591 A | 1/1978 | Scriven et al. | |
| 4,108,814 A * | 8/1978 | Reiff | C08G 18/5072 524/840 |
| 4,343,914 A | 8/1982 | Lee | |
| 6,172,126 B1 | 1/2001 | Mueller et al. | |
| 6,579,517 B1 | 6/2003 | Kim et al. | |
| 6,794,445 B2 | 9/2004 | Reusmann et al. | |
| 7,160,974 B2 | 1/2007 | Peerlings et al. | |
| 8,466,230 B2 * | 6/2013 | Killilea | C08G 18/12 524/591 |
| 9,404,019 B2 | 8/2016 | Muenter et al. | |
| 9,574,072 B2 | 2/2017 | Yun et al. | |
| 9,617,453 B2 | 4/2017 | Campbell et al. | |
| 2005/0003102 A1 | 1/2005 | Lockhart et al. | |
| 2005/0159575 A1 | 7/2005 | Rische et al. | |
| 2005/0222368 A1 | 10/2005 | Reiners et al. | |
| 2007/0112129 A1 | 5/2007 | Licht et al. | |
| 2009/0099082 A1 | 4/2009 | Schoenberger et al. | |
| 2009/0156704 A1 | 6/2009 | Stowell et al. | |
| 2009/0214651 A1 | 8/2009 | Fugmann et al. | |
| 2010/0098867 A1 | 4/2010 | Costa et al. | |

(Continued)

FOREIGN PATENT DOCUMENTS

| | | |
|---|---|---|
| CN | 103819648 A | 5/2014 |
| CN | 105297462 A | 2/2016 |

(Continued)

OTHER PUBLICATIONS

"Database WPI Week 201736", Thomspon Scientific, London, GB, AN 2017-191891 XP002792825 & CN 106496486.
Office Action issued in Canadian Application No. 3,118,068, dated Jul. 27, 2023; www.ic.gc.ca/opic-cipo/cpd/eng/patent/3118068/summary.html?query=3118068&start=&num=&type=basic_search.
Office Action of Japan application 2021-525777 Ref. No. F81297A1 Mailing No. 442217 Mailing Date: Sep. 4, 2023.
Examination Report of European Application 19816945.0 Ref.: 121418EP00 Date: Oct. 16, 2023.
First office action dated Nov. 6, 2024 received for related Korean patent application 10-2021-7015083; English Translation Mailing No. 9-5-2024-094688232 Mailing Date: Nov. 6, 2024.

*Primary Examiner* — Patrick D Niland
(74) *Attorney, Agent, or Firm* — Adams & Reese LLP

(57) ABSTRACT

A process for the preparation of a polyurethane dispersion with at least one extension agent B that has x hydroxyl groups and y amine groups, where $x+y\geq 2$ with x and y equal or larger than 0, and that has an additional functional group that is capable of forming a salt, such that the dispersion of the polyurethane has a solids content of at least 50 weight percent and does not contain acetone or other solvents or amines that have a boiling point of below 250° C.

13 Claims, No Drawings

(56) References Cited

U.S. PATENT DOCUMENTS

| | | | |
|---|---|---|---|
| 2011/0171277 | A1 | 7/2011 | Schoenberger |
| 2012/0232006 | A1* | 9/2012 | Schonberger ...... C08G 18/0828 521/137 |
| 2014/0215850 | A1 | 8/2014 | Redl et al. |
| 2014/0275411 | A1 | 9/2014 | Wright |
| 2015/0079406 | A1 | 3/2015 | Tennebroek et al. |
| 2015/0354133 | A1 | 12/2015 | Yan et al. |
| 2017/0190827 | A1 | 7/2017 | Plaver |
| 2017/0306122 | A1 | 10/2017 | Meyer-Ahrens et al. |
| 2017/0369624 | A1 | 12/2017 | Zhao et al. |
| 2021/0269578 | A1 | 9/2021 | Derksen et al. |
| 2021/0269669 | A1 | 9/2021 | Derksen |
| 2021/0277595 | A1 | 9/2021 | Van Den Berg et al. |

FOREIGN PATENT DOCUMENTS

| | | | |
|---|---|---|---|
| CN | 104004159 | B | 4/2016 |
| CN | 106496486 | A | 3/2017 |
| CN | 107794775 | A | 3/2018 |
| CN | 107814907 | A | 3/2018 |
| DE | 102015116528 | A1 | 3/2017 |
| EP | 0510743 | B1 | 8/1999 |
| EP | 1153051 | B1 | 12/2004 |
| EP | 1717257 | A1 | 11/2006 |
| EP | 1233991 | B1 | 7/2008 |
| EP | 2066712 | B1 | 1/2010 |
| EP | 1785439 | B1 | 3/2010 |
| EP | 2690117 | A1 | 1/2014 |
| EP | 3205679 | A1 | 8/2017 |
| JP | 3047098 | B2 | 5/2000 |
| JP | 2005-008888 | A | 1/2005 |
| JP | 2007-511621 | A | 5/2007 |
| KR | 20060090691 | A | 8/2006 |
| KR | 101565376 | B1 | 11/2015 |
| KR | 20170119141 | A | 10/2017 |
| WO | 2020111944 | A1 | 6/2020 |
| WO | 2020111945 | A1 | 6/2020 |
| WO | 2020130808 | A1 | 6/2020 |
| WO | 2020130831 | A1 | 6/2020 |

* cited by examiner

DISPERSIONS THAT ARE SUBSTANTIALLY FREE OF VOLATILE ORGANIC COMPOUNDS AND THAT HAVE A HIGH SOLIDS CONTENT

CROSS-REFERENCE TO RELATED APPLICATIONS

This application is a continuation-in-part application of International Patent Application No. PCT/NL2019/050792, entitled "PROCESS TO PREPARE AQUEOUS POLYURETHANE DISPERSIONS THAT ARE SUBSTANTIALLY FREE OF VOLATILE ORGANIC COMPOUNDS AND THAT HAVE A HIGH SOLIDS CONTENT", filed on Nov. 29, 2019, which claims priority to Netherlands Application No. 2022104, filed on Nov. 30, 2018, and the specification and claims thereof are incorporated herein by reference.

BACKGROUND OF THE INVENTION

Field of the Invention

One or more embodiments of the present invention relates to a process for preparing aqueous polyurethane dispersions of high solids content that are essentially free of volatile organic compounds, thus that do not contain solvents, that are free of volatile amines and that have been prepared in the absence of acetone or methyl acetate or any other volatile solvent.

Aqueous dispersions of polyurethanes are well known as basis for the production of coating compositions. They may be used for protective or decorative coating, optionally in combination with additives like colouring agents, pigments, matting agents, and the like. Polyurethanes can possess many desirable properties such as good chemical resistance, water resistance, solvent resistance, toughness, abrasion resistance, durability.

Background Art

As is well known in the art, aqueous polyurethane dispersions are particularly advantageously prepared by dispersing an isocyanate-terminated polyurethane prepolymer bearing ionic dispersing groups into an aqueous medium and then reacting the prepolymer with an active hydrogen containing chain extender while dispersed in the aqueous medium. See e.g. U.S. Pat. Nos. 4,046,729 and 4,066,591.

Dispersibility of the polyurethanes in water is often achieved by incorporation of appropriate chain pendant ionic groups in the structure of the polyurethane prepolymer. If suitable, external surfactants can be applied additionally. Preferably anionic groups are incorporated into the polyurethane backbone, such as carboxylic, sulfonic, sulphate or phosphate groups, by reaction of an isocyanate reactive compound having at least one acid group with a polyisocyanate. Most common is the incorporation of a carboxylic acid functional compound. The carboxylic acid functions are generally neutralized before or during dispersion of the polyurethane prepolymer in water with a volatile tertiary amine. A disadvantage of the application of volatile tertiary amines as neutralizing agent is that they evaporate during the film formation, and therefore will cause environmental pollution and that this evaporation during film formation is often not complete, which results in residual volatile amines in the cured coating, which can subsequently slowly evaporate during the lifetime of the coating. Volatile amines contribute to the total content of volatile organic compounds (VOC) in the aqueous polyurethane dispersion.

In the early days the aqueous polyurethane dispersions contained solvents besides water, the solvent being used as a processing aid during the prepolymer preparation stage. Still many commercially available aqueous polyurethane dispersions contain solvents. It is well known that also aqueous polyurethane dispersions can be made without the use of solvents. This can be done by avoiding the use of solvents, but can also be achieved by using acetone during the preparation of the aqueous polyurethane dispersions, followed by distilling the acetone off from the aqueous polyurethane dispersions, but this has the disadvantage that a certain amount of acetone will remain in the aqueous polyurethane dispersions. Solvents, including acetone, contribute to the total content of VOC in the aqueous polyurethane dispersion.

US 2005/003102 describes waterborne, UV curable polyurethane emulsions prepared by reacting specified hydroxyl-functional components including compounds having hydroxyl and/or amino groups and an additional functional group that is capable of forming a salt with di- and/or polyisocyanates, forming a dispersion of the resultant product with water and reacting the dispersion with amine functional materials as extending agents. The polyurethane prepolymer formation is carried out in the presence of solvents such as acetone which is afterwards distilled off. Further the list of bases and acids that may be used for salt formation include volatile amines such as triethylamine and triethanolamine, which also contribute to VOC.

The presence of residual VOC is undesired, because release of this VOC during the lifetime of the cured coating may expose humans to VOC, which may cause headaches, nausea, fatigue etc. especially when the cured coating is used in a confined space like an automotive interior. In addition, several countries have legislations that limit the amount of VOC that a company may release during a period of time, which further motivates to reduce the amount of VOC.

The use of polyurethane dispersions of higher solids content is advantageous due to the fact that a cured coating of higher thickness can be obtained when applying the same wet thickness of aqueous polyurethane dispersion. When a similar thickness of cured coating is desired, it means that less amount of water needs to be evaporated when using aqueous polyurethane dispersions of higher solids content, which saves time and energy. If a large thickness of cured coatings is desired then it is not always possible to achieve this by drying and curing one wet layer of the aqueous polyurethane layer, so several steps are required: applying a wet coating, drying and curing and then again applying a wet coating and drying and curing, until the desired dried layer thickness is obtained. The use of aqueous polyurethane dispersions of higher solids content allows the employment of a lower number of coating layers, as each layer made from aqueous polyurethane dispersions of higher solids gives a higher dried thickness provided that the same wet thickness has been applied, which saves processing steps.

Polyurethane dispersions with a high solid content of above 50% (weight/weight) are described in some references. Examples of aqueous polyurethane dispersions with a high solid content of 50% or above 50% can be found in US 2009/0099082, US 2011/0171277, US 2009/0214651 and U.S. Pat. No. 3,989,869. However, the methods described in these documents employ a solvent that is evaporated to achieve a high solids content of the polyurethane dispersion, which is undesirable because this is an additional processing step with accompanying higher expenses, and this may further require steps to recover the solvent or at least take steps to prevent that the solvent will cause environmental problems. A further disadvantage is that residual amounts of the solvent will remain in the aqueous polyurethane dispersions thereby increasing VOC content.

EP 1153051B1 describes aqueous dispersions of anionic polyurethanes with pendant carboxylic acid groups that are neutralised with a reactive volatile amine compound (tertiary amino functional acrylic monomer) that is subsequently incorporated in the polymer backbone by radical polymerization. Unreacted free monomer remains in the final product which thus still contains volatile amines. The monomer may also contain impurities and hydrolysis may generate the undesirable side product dimethylethanol amine.

EP 3205679A1, U.S. Pat. No. 9,617,453 and EP 1717257A1 describe methods for the preparation of solvent-free aqueous polyurethane dispersions, having low VOC emissions, but volatile amines are used as neutralizing agents.

US 2015/079406A1 describes a process for preparing an aqueous dispersion of a polyurethane that is substantially free of volatile amines and N-alkyl-pyrrolidinones, but this involves using also an acrylate monomer and subsequent radical polymerization. This process thus describes the preparation of a polyurethane/acrylic polymer dispersion. Likewise, CN 107814907 describes a process for preparing an aqueous dispersion of a polyurethane/polyacrylate that is zero VOC and free of volatile amines.

US 2010/098867A1 describes a process for the preparation of aqueous dispersions of carboxylated anionic polyurethanes free from volatile amines, using alkaline metal hydroxides as neutralizing agents, but the solids contents of the obtained polyurethane dispersions are below 40%.

U.S. Pat. No. 6,172,126 describes a process for the preparation of aqueous polyurethane dispersions that are co-solvent free. However, volatile amines are used as neutralizing agents and during the prepolymer stage the process uses acetone, which is later distilled off. Such polyurethane dispersions made via the acetone process will have a certain amount of acetone remaining in the dispersion after the distillation step.

Likewise, EP 2066712B1 describes a process for preparing aqueous polyurethane-polyurea dispersions, characterized in that the reaction for preparing the prepolymer or the further chain extension reaction or else both reaction steps is or are carried out in the presence of methyl acetate. The methyl acetate is in a subsequent step distilled off, but a certain amount of methyl acetate will remain in the dispersion after the distillation step. In this process also volatile amines are used as neutralizing agents.

Being solvent-free, substantially free of volatile amines, substantially free of VOC and having a high solids content constitutes a much desired combination of properties of aqueous polyurethane dispersions. It is therefore the aim of one embodiment of the present invention to provide such aqueous polyurethane dispersions and to provide a process for manufacturing them.

BRIEF SUMMARY OF THE INVENTION

One embodiment of the present invention provides a process for the preparation of a polyurethane dispersion substantially free from volatile organic compounds comprising the steps of:

i) synthesizing, in the absence of acetone or other solvents, a polyurethane prepolymer from isocyanates, polyols, which may include polyols with hydrophilic groups, and a component A, said component A having x hydroxyl groups and y amine groups, wherein both x and y independently can be 0 or more than 0 and wherein $x+y \geq 2$, and having an additional functional group that is capable of forming a salt; and ii) dispersing the obtained prepolymer into a water phase comprising water, one or more neutralizing agents, such as alkaline metal hydroxide, and optionally an emulsifier, and forming polyurethane by reacting with one or more extension agents comprising a component B, said component B having x hydroxyl groups and y amine groups, wherein both x and y independently can be 0 or more than 0 and wherein $x+y \geq 2$, and having an additional functional group that is capable of forming a salt, such that the dispersion of the polyurethane has a solids content of at least about 50 weight percent and does not contain acetone or other solvents and does not contain amines or other volatile compounds that have a boiling point of below about 250° C.

The aqueous polyurethane dispersions made according to one embodiment of the present invention are not prepared using (organic) solvents that are to be evaporated to make a dispersion of the desired solids content. The polyurethane prepolymers are synthesized in the absence of acetone or any other volatile solvent.

In the context of an embodiment of the present invention, substantially free of VOC means that the amount of VOC in the aqueous polyurethane dispersion is less than about 1000 ppm, preferably below about 500 ppm and more preferably below about 100 ppm.

In the context of an embodiment of the present invention, the term VOC is meant to refer to organic chemical compounds which can quickly evaporate into air due to their high vapour pressure and low boiling point; as VOC is considered any organic compound having an initial boiling point less than or equal to about 250° C. measured at a standard pressure of about 101.3 kPa, which follows the European Directive 2004/42/EC. VOC's which are customarily used in the preparation of aqueous polyurethane dispersions include various solvents, co-solvents and volatile amines such as acetone, methyl ethyl ketone, dipropylene glycol dimethyl ether, 1-ethyl-2-pyrrolidon, 1-methyl-2-pyrrolidon, trimethylamine, N,N-dimethylethanolamine, N,N-diethylethanolamine, 4-ethylmorpholine.

Polyurethane dispersions are generally made by dispersing a polyurethane prepolymer into water. Suitable prepolymers may be made using isocyanate components. These isocyanates are reacted with polyols. Preferred prepolymers may be made with aliphatic di-isocyanates, aromatic di-isocyanates, or a mixture of aromatic and aliphatic di-isocyanates, such as toluene-2,4-diisocyanate, toluene-2,6-diisocyanate and mixtures thereof, diphenylmethane-4,4-diisocyanate, 1,4-phenylenediisocyanate, dicyclohexylmethane-4,4'-diisocyanate, 3-isocyanatomethyl-3,5,5-trimethylcyclo-hexylisocyanate, 1,6-hexyldiisocyanate, 1,5-pentyldiisocyanate, 1,3-bis(isocyanatomethyl)cyclohexane, 2,2,4-trimethyl-1,6-diisocyanatohexane (2,2,4-isomer, 2,4,4-isomer, or mixture thereof), 1,4-cyclohexyldiisocyanate, norbonyldiisocyanate, p-xylylene diisocyanate, 2,4'-diphenylmethane diisocyanate, and/or 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues. Particularly preferred polyisocyanates include aliphatic polyisocyanates such as 3-isocyanatomethyl-3,5,5-trimethylcyclohexylisocyanate, hexamethylene diisocyanate and dicyclohexyl-methane-4,4'-diisocyanate.

Polymeric polyols having molecular weights in the range of about 500 to 6000 which may be used in the preparation of the prepolymer particularly include diols and triols and mixtures thereof but higher functionality polyols may be used as well, for example as minor components in admixture with diols. The polyols may be members of any of the chemical classes of polymeric polyols used or proposed to be used in polyurethane formulations. Preferred polyols are selected from the group of polyester polyols, polyesteramide polyols, polyether polyols, polythioether polyols, polycarbonate polyols, polyacetal polyols, polyolefin polyols or polysiloxane polyols or mixtures thereof. Preferred polyol molecular weights are from about 700 to about 4000. Polyols having molecular weights below about 500 which may optionally be used in the preparation of the prepolymer particularly include diols and triols and mixtures thereof but higher functionality polyols may be used. Examples of such lower molecular weight polyols include ethylene glycol, diethylene glycol, triethylene glycol, tetraethylene glycol, bis (hydroxyethyl) terephthalate, neopentylglycol, trimethylol propane, cyclohexane dimethanol, furan dimethanol, glycerol and the reaction products, up to molecular weight about 499, of such polyols with propylene oxide and/or ethylene oxide.

Dispersibility of the polyurethane prepolymers in water can be achieved by incorporating hydrophilic groups into the prepolymer. For this reason, other polyols may be present during the prepolymer formation such as a polyethoxy diol, a poly(ethoxy/propoxy) diol, a diol containing a pendant ethoxy or (ethoxy/propoxy) chain, a polyethoxy mono-ol, a poly(ethoxy/propoxy) mono-ol, a mono-ol containing a pendant ethoxy or (ethoxy/propoxy) chain, a mono-ol containing a carboxylic acid or a sulfonic acid or salt, or mixtures thereof. In an embodiment of the present invention at least a component A is incorporated into the prepolymer, wherein component A has x hydroxyl groups and y amine groups, wherein both x and y independently can be 0 or more than 0 and wherein $x+y \geq 2$, and that has an additional functional group that is capable of forming a salt such as a carboxyl group, a sulfonic group or a phosphate group. Examples of suitable components A include but is not limited to diols or triols containing a carboxylic acid group, such as dihydroxy alkanoic acids of the formula: R-C—$(CH_2$—$OH)_2$—COOH wherein R is hydrogen or alkyl, for example 2,2-dimethylolpropionic acid and 2,2-dimethylolbutanoic acid, and diols containing a sulfonic group, such as 4,6-diaminobenzene-1,3-disulfonic acid, sodium 1,4-dihydroxy-2-butanesulfonate, N,N-Bis-(2-hydroxyethyl)-N-methyl-3-sulfopropyl-ammonium betaine, N,N-Bis-(2-hydroxyethyl)-N-methyl-3-sulfopropyl-ammonium betaine prepolymer (MDAPS PP from Raschig), and diols containing a phosphate group, such as 1-glycerol phosphate or 2-glycerol phosphate. Other examples of component A are sodium 2-[(2-aminoethyl) amino]ethane-sulfonate and amino carboxylic acids, for example lysine, cysteine and 3,5-diaminobenzoic acid.

Preferably the component A contains a carboxylate group. Most preferably the component A is a carboxyl containing diol.

In the context of an embodiment of the present invention, in case where the majority of the amount of polyols used are polyols from the polycarbonate group, the amount of said component A is preferably below about 2% based on the weight of the total prepolymer, more preferably below about 1.5% and most preferably below about 1%, so that the viscosity of the prepolymer does not become too high at the desired process temperature, because with a too high viscosity of the prepolymer it becomes too difficult to pump the prepolymer. In case where the majority of the amount of polyols used are not polyols from the polycarbonate group, the amount of said component A may also be above about 2% based on the weight of the total prepolymer, a usual amount of said component A being between about 1% and about 5% by weight based on the weight of the prepolymer, as the viscosity of the prepolymer is then expected to be not too high at the desired process temperature, so that it is possible to pump the prepolymer.

The polyurethane prepolymer may contain additional functional groups with the objective to improve the water dispersibility, to improve adhesion to substrates during application, for performance reasons, or as potential sites for crosslinking. Suitable functions are polyalkoxy functions with a large concentration of ethoxy functions, tertiary amine or quaternary amine functions, perfluoro functions, incorporated silicon functions, hydrazide functions or hydrazone functions, ketone, acetoacetate, or aldehyde functions, or mixtures thereof.

The conversion of any acid groups present in the prepolymer to anionic groups may be affected by neutralising the said additional functional groups from component A that are capable of forming a salt before, after or simultaneously with formation of the aqueous dispersion, but generally prior to reaction with extension agent. Suitable neutralising agents include alkaline metal hydroxides such as sodium hydroxide, potassium hydroxide, lithium hydroxide or non-volatile tertiary amines such as N-butyldiethanolamine or N,N-bis [3-(dimethylamino)propyl]-N',N'-dimethylpropane-1,3-diamine or mixtures thereof. Preferably alkaline metal hydroxides are used as the major or sole neutralising agent, preferably added to the water phase. In the context of an embodiment of the present invention, the amount of neutralising agent is such that between about 0.60 and about 1.20, preferably between about 0.70 and about 1.20 and most preferably between about 0.75 and about 1.10 of equivalent of neutralising agent is added with respect to the functional groups capable of forming a salt that are present in the amount of prepolymer.

Polyurethane prepolymers useful in the practice of an embodiment of the present invention may be prepared in conventional manner by reacting a stoichiometric excess of the organic polyisocyanate with the polymeric polyol having a molecular weight in the range about 500 to about 6000 and the other required isocyanate-reactive compounds under substantially anhydrous conditions at a temperature between about 30° C. and about 130° C. until reaction between the isocyanate groups and the hydroxyl groups is substantially complete. The polyisocyanate and the active hydrogen containing components are suitably reacted in such proportions that the ratio of number of isocyanate groups to the number of hydroxyl groups is in the range from about 1.1:1 to about 6:1, preferably within the range of from 1.5:1 to 3:1. If desired, catalysts, such as bismuth carboxylate, zinc carboxylate, dibutyltin dilaurate, aluminium chelate, zirconium chelate, stannous octoate or triethylenediamine, may be used to assist prepolymer formation.

Prepolymers useful in the practice of an embodiment of the present invention should be substantially liquid under the conditions of the dispersing step, which means that these prepolymers should have a viscosity below about 100,000 mPa·s at a temperature of about 90° C., measured using a Brookfield LVF Viscometer.

One or more embodiments of the present invention include the use of an extension agent, which is used to build the molecular weight of the polyurethane prepolymer by reacting the extension agent with the isocyanate functionality of the polyurethane prepolymer. The active hydrogen containing extension agent which is reacted with the prepolymer is suitably a polyol, an amino alcohol, ammonia, a primary or secondary aliphatic, alicyclic, aromatic, araliphatic or heterocyclic amine especially a diamine, hydrazine, hydrazine hydrate or a substituted hydrazine. Water-soluble extension agents are preferred, and water itself may be effective. Examples of suitable extension agents useful herein include ethylene diamine, diethylene triamine, triethylene tetramine, propylene diamine, butylene diamine, hexamethylene diamine, cyclohexylene diamine, piperazine, 2-methyl piperazine, phenylene diamine, bis(3-aminopropylamine), tolylene diamine, xylylene diamine, tris (2-aminoethyl) amine, 3,3'-dinitrobenzidine, 4,4'methylenebis (2-chloraniline), 3,3'-dichloro-4,4'bi-phenyl diamine, 2,6-diaminopyridine, 4,4'-diaminodiphenylmethane, menthane diamine, m-xylene diamine, 5-amino-1,3,3-trimethyl-cyclohexanemethyl-amine, amine terminated polyethers such as, for example, Jeffamine D-230 from Huntsman Chemical Company, and adducts of diethylene triamine with acrylate or its hydrolyzed products. Also suitable are materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids, adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semicarbazide, bis-hydrazide carbonic esters of glycols such as any of the glycols mentioned above. Also suitable are mixtures of extension agents.

In accordance with an embodiment of the present invention the extension agent comprises a component B that has x hydroxyl groups and y amine groups, wherein both x and y independently can be 0 or more than 0 and wherein $x+y\geq 2$, and that has a further functional group that is capable of forming a salt such as a carboxylate, sulfonate or phosphate group. Examples of suitable component B extension agents include but is not limited to sodium 2-[(2-aminoethyl) amino]ethanesulfonate (e.g. Vestamin A95 from Evonik), lysine, 3-(2-aminoethylamino)propane-1-sulfonic acid, polymer of 3-(2-aminoethylamino)propane-1-sulfonic acid (Poly-EPS from Raschig), sodium N-(2-aminoethyl)-β-alaninate (PUD Salt from BASF). Preferably component B contains a sulfonate group, most preferably one or more sodium sulfonate groups, optionally in combination with one or more amino groups. A particularly preferred compound B is sodium 2-[(2-aminoethyl)amino]ethanesulfonate.

According to an embodiment of the present invention component A and component B may the same or different compounds, the latter being preferred.

In the context of an embodiment of the present invention, the extension agent, or at least one of the extension agents in case a mixture of extension agents is used, is a component B. Component B could be used as the sole extension agent but preferably it is used in combination with other types of extension agent. Preferably the amount of component B is such that between about 0.02 to about 0.70, preferably between about 0.05 and about 0.50 and most preferably between about 0.05 and about 0.30, of equivalent of isocyanate reactive groups is added with respect to the isocyanate functions that are present in the prepolymer and the remaining isocyanate functions are extended by other extension agents. Preferred amongst the other extension agents are hydrazine, ethylene diamine, propylene diamine, 5-amino-1,3,3-trimethyl-cyclohexanemethyl-amine, and amine terminated polyethers such as, for example, Jeffamine D-230 from Huntsman Chemical Company.

The total amount of extension agent employed should be approximately equivalent to the free NCO groups in the prepolymer; the ratio of active hydrogens in the total extension agent to NCO groups in the prepolymer preferably being in the range from about 0.7:1 to about 2.0:1. Of course when water is employed as an extension agent, these ratios will not be applicable since the water, functioning both as extension agent and dispersing medium, will be present in a gross excess relative to the free NCO groups.

While polyurethane prepolymers may retain some isocyanate reactivity for some period of time after dispersion, for purposes of an embodiment of the present invention, a polyurethane prepolymer dispersion is considered to be a fully reacted polyurethane polymer dispersion. Also, for purposes of an embodiment of the present invention, a polyurethane prepolymer or polyurethane polymer can include other types of structures such as, for example, urea groups.

The aqueous polyurethane dispersion comprises at least about 50 wt %, preferably at least about 55 wt %, more preferably at least about 60 wt % of polyurethane polymer particles based on total mass of the dispersion. As conventionally done by the skilled person, the weight percentage is calculated beforehand, taking into account which components evaporate and which components do not evaporate. The solids percentage is at a later stage measured to confirm: thereto, a small amount is weighted, then put in an oven at about 105° C. during one hour and the remaining amount is measured. In this control step, a higher or longer temperature/time regime can be chosen as well, if there are slowly evaporating components present.

If desired, amounts of emulsifiers, defoamers, flame retardants, thickeners, stabilizers, anti-oxidants and/or anti-settling agents may be included in the prepolymer or the water phase, or may be added to the aqueous polyurethane dispersion.

The prepolymer thus prepared and a water phase are being mixed to obtain a polyurethane dispersion, wherein the extension agent, if the extension agent is different from water, can be added to the water phase prior to the dispersing step, or can be added during the dispersing step, or can be added to the dispersion after the dispersing step. Optionally, neutralization agents, undiluted or with water diluted additives, like emulsifiers, defoamers, flame retardants, thickeners, stabilizers, anti-oxidants and/or anti-settling agents can be added to the water phase or to the dispersion.

The viscosity of the aqueous polyurethane dispersion of the invention is generally lower than about 1000 mPa·s, preferably lower than about 750, more preferably lower than about 500, and most preferably lower than about 250 mPa·s, as measured at about 25° C. using a Brookfield LVF Viscometer.

The above-described specific embodiments are all embodiments in accordance with the present invention. The various embodiments may be mutually combined. A feature described for one particular embodiment may be taken up, incorporated in or otherwise combined with other particular embodiments unless the laws of physics would forbid such combinations.

One or more embodiment of the present invention will be further elaborated by the following non-limiting working examples. Parts and percentages of components referred to in these working examples are drawn to the weight of the total composition wherein these components are present, like in the other parts of the description and claims, unless otherwise indicated.

EXAMPLES

Example 1: Preparation of Polyurethane Dispersion

Under a nitrogen atmosphere a mixture of 415 g of a poly(tetramethylene ether) glycol with a molecular weight of 2000, 57 g of a polycarbonate diol, derived from hexanediol, with a molecular weight of 1000 and 4 g of dimethylolpropanoic acid were heated to 50° C. while stirring. 70 g of 3-isocyanatomethyl-3,5,5-trimethylcyclo-hexylisocyanate and 25 g of hexamethylene diisocyanate were added and the mixture was heated to 85° C. and stirred for 1.5 hours to form a polyurethane prepolymer. The reaction was cooled down and the amount of remaining NCO was measured. The prepolymer was dispersed into a water phase consisting of 390 g of water, 15 g of Synperonic PE/L62 (an emulsifier from Croda), 1.2 g of potassium hydroxide and 13 g of Vestamin A95 (a solution of sodium 2-[(2-aminoethyl) amino]ethane-sulfonate.from Evonik). Subsequently, 8 g of hydrazine hydrate was added and the dispersion was stirred for 15 minutes. The solids content of the dispersion was 60%. The viscosity of the dispersion was 200 mPa·s, as measured at 25° C. using a Brookfield LVF Viscometer.

Example 2: Preparation of Polyurethane Dispersion

Under a nitrogen atmosphere a mixture of 205 g of a polycarbonate diol, derived from pentane diol and hexane diol, with a molecular weight of 2000, 205 g of a polycarbonate diol, derived from hexanediol, with a molecular weight of 1000, 4 g of dimethylolpropanoic acid and 14 g of Ymer-120 (a linear difunctional polyethylene glycol monomethyl ether from Perstorp) were heated to 50° C. while stirring. 115 g of 3-isocyanatomethyl-3,5,5-trimethylcyclo-hexylisocyanate and 30 g of hexamethylene diisocyanate were added and the mixture was heated to 85° C. and stirred for 1.5 hours to form a polyurethane prepolymer. The reaction was cooled down and the amount of remaining NCO was measured. The prepolymer was dispersed into a water phase consisting of 390 g of water, 15 g of Synperonic PE/L62 (an emulsifier from Croda), 1.8 g of potassium hydroxide, 6 g of Vestamin A95 (a solution of sodium 2-[(2-aminoethyl)-amino]ethanesulfonate.from Evonik) and 3 g of hydrazine hydrate. Subsequently, 13 g of hydrazine hydrate was added and the dispersion was stirred for 15 minutes. The solids content of the dispersion was 60%. The viscosity of the dispersion was 200 mPa·s, as measured at 25° C. using a Brookfield LVF Viscometer.

Example 3: Preparation of Polyurethane Dispersion

Under a nitrogen atmosphere a mixture of 200 g of a polycarbonate diol, derived from pentane diol and hexane diol, with a molecular weight of 2000, 200 g of a polycarbonate diol, derived from hexanediol, with a molecular weight of 1000, 4 g of dimethylolpropanoic acid and 14 g of Ymer-120 (a linear difunctional polyethylene glycol monomethyl ether from Perstorp) were heated to 50° C. while stirring. 100 g of 3-isocyanatomethyl-3,5,5-trimethylcyclo-hexylisocyanate and 50 g of 2,2,4-trimethylhexamethylene diisocyanate were added and the mixture was heated to 85° C. and stirred for 1.5 hours to form a polyurethane prepolymer. The reaction was cooled down and the amount of remaining NCO was measured. The prepolymer was dispersed into a water phase consisting of 390 g of water, 15 g of Synperonic PE/L62 (an emulsifier from Croda), 3.7 g of potassium hydroxide, 6 g of Vestamin A95 (a solution of sodium 2-[(2-aminoethyl)amino]ethanesulfonate.from Evonik) and 3 g of hydrazine hydrate. Subsequently, 13 g of hydrazine hydrate was added and the dispersion was stirred for 15 minutes. The solids content of the dispersion was 60%. The viscosity of the dispersion was 200 mPa·s, as measured at 25° C. using a Brookfield LVF Viscometer.

Example 4: Solvent Resistance Testing of Polyurethane Dispersions

Each of the dispersions of Examples 1 to 3 was applied on a glass sheet at a thickness of 600 μm. The glass sheet with the applied film on it was dried for 1 day at room temperature and subsequently for 8 hours at 80° C. in an oven. Samples of the dried film were subjected to a solvent uptake test with water, ethanol or MEK (methylethylketone or 2-butanone) as solvent. In this test, pieces of dried and weighted film are immersed into water, ethanol or MEK for 1 hour and then the increase of the weight of the film is determined. A lower weight increase is better.

TABLE 1

| Example | Weight increase water[a] | Weight increase ethanol[b] | Weight increase MEK[c] |
|---|---|---|---|
| Example 1 | 8.2 | 215 | 262 |
| Example 2 | 14.8 | 535 | 46 |
| Example 3 | 14.6 | 562 | 46 |

[a]Weight increase is the % weight increase of the film as result of immersing into water.
[b]Weight increase is the % weight increase of the film as result of immersing into ethanol.
[c]Weight increase is the % weight increase of the film as result of immersing into MEK (methylethylketone, or 2-butanone).

The results of the solvent resistance tests presented in Table 1 demonstrate that dried films made from the aqueous polyurethanes dispersions of the invention (Examples 1 to 3) have good resistance against water, as the weight increase upon immersing in water was low.

Example 5: Testing of Dispersions on VOC

The polyurethane dispersions of the Examples 1 to 3 were tested on presence of volatile components. The results are reported in Table 2.

The amount of total volatile organic compounds (TVOC) was measured according to the VDA 277 method with Headspace analysis. The apparatus used was an Interscience Trace 1300 Gas Chromatograph Interscience ISQ (Single Quadrupole MS). The column was Restek Stabil wax®-MS, 30 meter, 0.25 mmID, 0.25 μm df. The GC oven temperature program was: 3 minutes isothermal at 50° C., then heating to 200° C. at a rate of 12° C./minute, followed by 4 min isothermal at 200° C. The sample preparation was: 100 mg of the liquid sample was transferred into the Headspace vial. The samples were put in the Headspace oven for 5 hours at 120° C., and 1 ml of the vapor was injected into the GCMS. The samples were measured in duplicate. The mean TVOC value and main emission compounds (>1 μgC/g) are reported. The TVOC values were calculated as acetone equivalent.

TABLE 2

| Example | TVOC VDA 277 |
|---|---|
| | (μgC/g) 'Acetone' |
| 1 | 0 |
| 2 | 21 |
| 3 | 13 |

The preceding examples can be repeated with similar success by substituting the generically or specifically described reactants and/or operating conditions of this invention for those used in the preceding examples.

Note that in the specification and claims, "about" or "approximately" means within twenty percent (20%) of the numerical amount cited.

Although the invention has been described in detail with particular reference to these embodiments, other embodiments can achieve the same results. Variations and modifications of embodiments of the present invention will be obvious to those skilled in the art and it is intended to cover in the appended claims all such modifications and equivalents. The entire disclosures of all references, applications, patents, and publications cited above are hereby incorporated by reference.

The invention claimed is:

1. A process for the preparation of a polyurethane dispersion substantially free from volatile organic compounds and maintaining a total VOC content of less than 1000 ppm, said dispersion not containing amines or other volatile compounds that have a boiling point of below 250° C., the process comprising the steps of:

(i) synthesizing, in the absence of acetone or methyl acetate or any other volatile solvent, a polyurethane prepolymer from isocyanates, polyols selected from polycarbonate polyols and polycarbonate-polyether polyol mixtures, and a component A present in an amount below 2 weight percent based on the total weight of the prepolymer, wherein said component A is a carboxyl containing diol, and (ii) dispersing the obtained prepolymer into a water phase optionally comprising other non-volatile additives, (iii) adding one or more non-volatile neutralizing agents prior to, simultaneously with or after dispersing the prepolymer in water and, (iv) forming, simultaneously with or subsequent to the dispersing, polyurethane by reacting with one or more extension agents comprising a component B, said component B having x hydroxyl groups and y amine groups, wherein x can be 0 or more than 0 and $x+y\geq 2$, and wherein component B contains one or multiple amino groups and one or multiple sulfonate groups capable of forming a salt, such that the dispersion of the polyurethane has a solids content of at least 50 weight percent and a viscosity lower than 250 mPa·s as measured at 25° C. using a Brookfield LVF viscometer, and wherein the amount of component B is such that between 0.02 and 0.70 equivalent of isocyanate reactive groups is added with respect to the isocyanate functions that are present in the prepolymer, and the remaining isocyanate functions are extended by other extension agents, wherein the total amount of extension agent employed is such that the ratio of isocyanate reactive groups in the total amount of extension agent to the isocyanate groups in the prepolymer is in the range from about 0.7:1 to about 2.0:1.

2. The process according to claim 1, wherein the isocyanates are aliphatic di-isocyanates, aromatic di-isocyanates, or a mixture of aromatic and aliphatic di-isocyanates.

3. The process according to claim 1 wherein the solids content of the aqueous polyurethane dispersion is at least about 55 weight percent.

4. The process according to claim 1 wherein the solids content of the aqueous polyurethane dispersion is at least about 60 weight percent.

5. The process according to claim 1, wherein the aqueous polyurethane dispersion has a total VOC content of less than about 1000 ppm.

6. The process according to claim 1, wherein the aqueous polyurethane dispersion has a total VOC content of less than about 500 ppm.

7. The process according to claim 1, wherein the aqueous polyurethane dispersion has a total VOC content of less than about 100 ppm.

8. A dispersion obtained by the process of claim 1.

9. A coating or film obtained from a dispersion as defined in claim 8.

10. The process according to claim 1, wherein the one or more non-volatile neutralizing agents added in (iii) are alkaline metal hydroxides.

11. The process according to claim 1, wherein component B contains sodium 2-[(2-aminoethyl)amino]ethanesulfonate.

12. The process according to claim 2, wherein the aliphatic di-isocyanates, aromatic di-isocyanates, or mixture of aromatic and aliphatic di-isocyanates are selected from toluene-2,4-diisocyanate, toluene-2,6-diisocyanate and mixtures thereof, diphenylmethane-4,4-diisocyanate, 1,4-phenylenediisocyanate, dicyclohexyl-methane-4,4'-diisocyanate, 3-isocyanatomethyl-3,5,5-trimethylcyclohexylisocyanate, 1,6-hexyldiisocyanate, 1,5-pentyldiisocyanate, 1,3-bis(isocyanatomethyl)cyclo-hexane, 2,2,4-trimethyl-1,6-diisocyanatohexane (2,2,4-isomer, 2,4,4-isomer, or mixture thereof), 1,4-cyclohexyldiisocyanate, norbonyldiisocyanate, p-xylylene diisocyanate, 2,4'-diphenylmethane diisocyanate, and 1,5-naphthylene diisocyanate.

13. The process according to claim 1, wherein the other extension agents are selected from hydrazine, ethylene diamine, propylene diamine, 5-amino-1,3,3-trimethyl-cyclohexanemethyl-amine, and amine terminated polyethers.

* * * * *